Oct. 14, 1952     P. B. REEVES     2,613,545

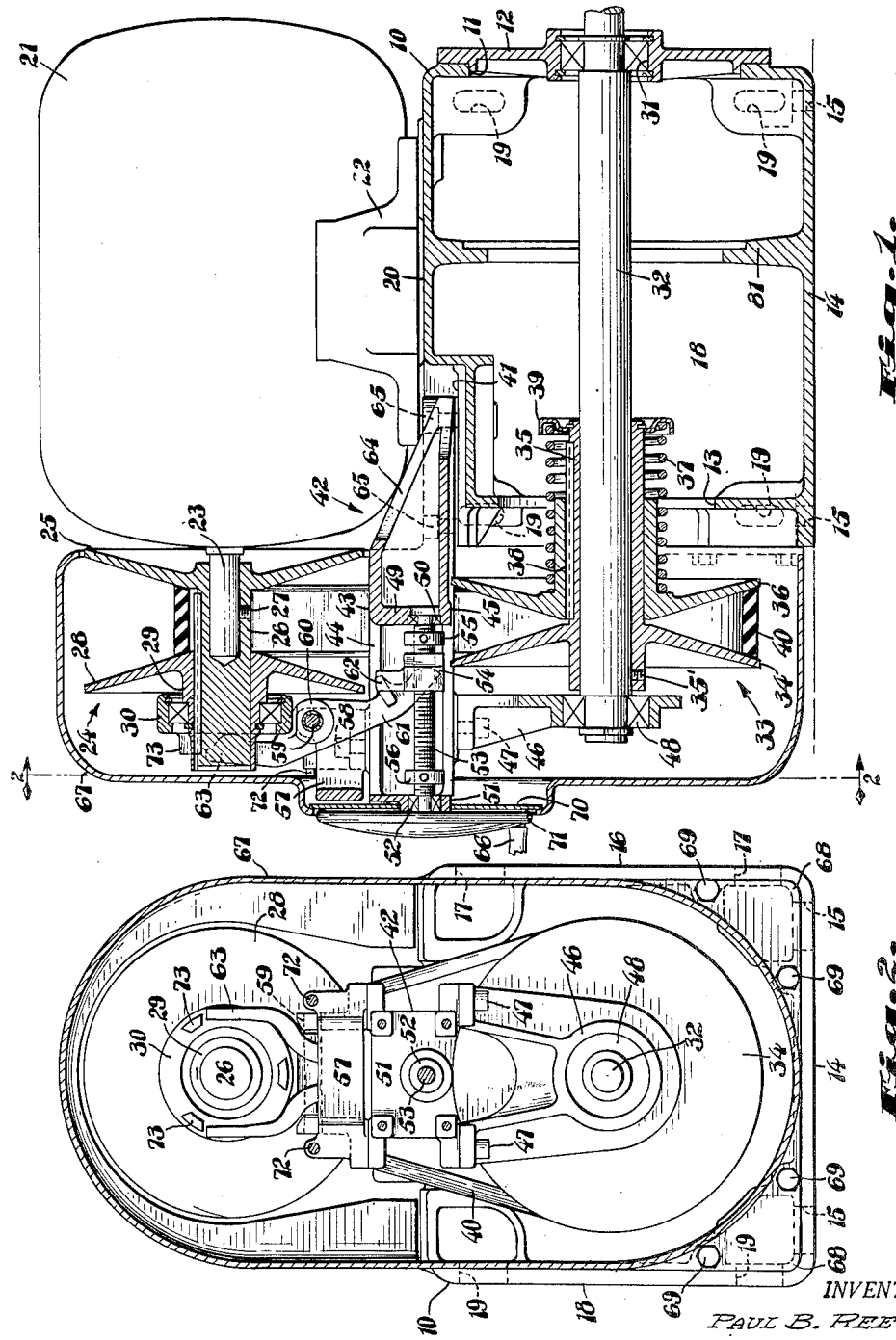

SPEED-VARYING POWER TRANSMISSION

Filed June 14, 1951     2 SHEETS—SHEET 2

INVENTOR.
PAUL B. REEVES,
BY Harold B. Hood.
ATTORNEY.

Patented Oct. 14, 1952

2,613,545

UNITED STATES PATENT OFFICE 2,613,545

SPEED-VARYING POWER TRANSMISSION

Paul B. Reeves, Columbus, Ind., assignor to Reeves Pulley Company, Columbus, Ind., a corporation of Indiana Application June 14, 1951, Serial No. 231,613

16 Claims. (Cl. 74—230.17)

The present invention relates to speed-varying power transmissions, and is primarily concerned with refinements in the manufacture and assembly of such transmissions. A major object of the invention is to provide a unit of the character described made up of individual parts which may be interchanged with other analogous parts, whereby transmissions of variable characteristics may be constructed by selecting appropriate parts for assembly.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a longitudinal section through a unit constructed in accordance with the present invention;

Fig. 2 is a transverse section taken substantially on the line 2, 2 of Fig. 1;

Figure 4:
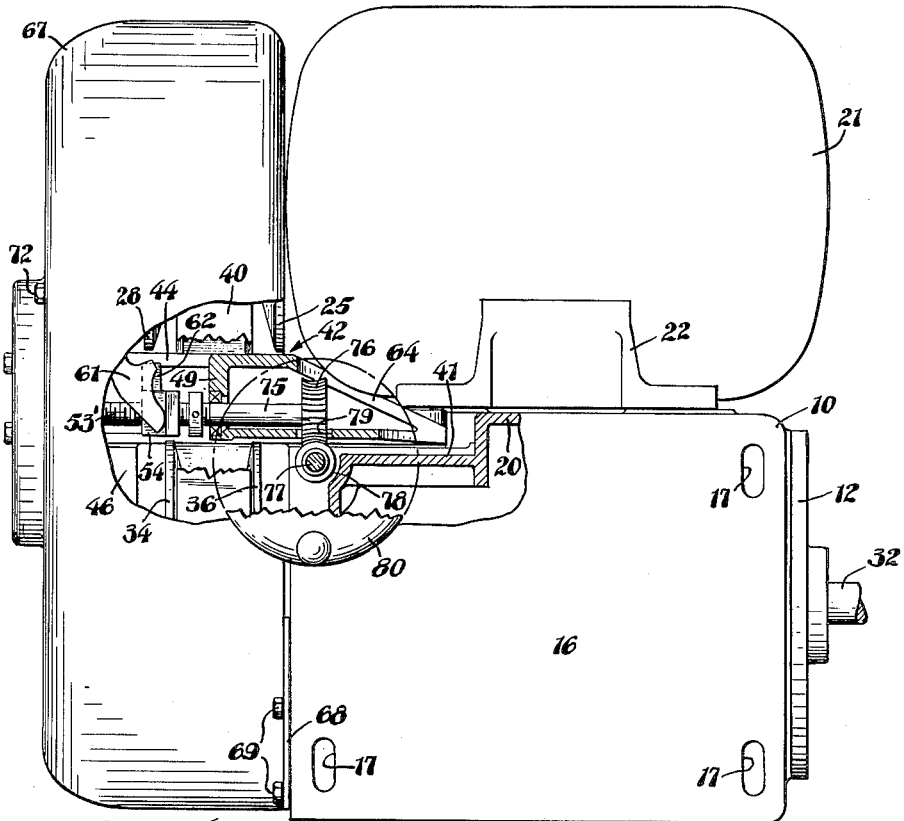
Fig. 4 is a side elevation of a modified form of unit, parts being broken away for clarity of illustration.

Referring more particularly to the drawings, it will be seen that I have illustrated a main frame 10 which, in its preferred form, is a box-like casting having an opening 11 in one end wall adapted to be closed by a removable plate 12. Said frame is formed in its opposite end wall with an opening 13, preferably concentric with the opening 11, for a purpose which will become apparent.

One wall 14, which may be referred to as the bottom wall, is formed adjacent each corner with an elongated slot 15 for the reception of a holddown bolt, lag screws or the like whereby the frame may be secured to any suitable floor, table or platform. Preferably, I provide one side wall 16 of the frame with similar slots 17, and I provide the other side wall 18 with similar slots 19. The versatility of the unit to be described is thus increased, in that the frame may be mounted in the upright position shown, or it may be mounted in a horizontal position with the input shaft to the left of the output shaft, or in a horizontal position with the input shaft to the right of the output shaft. It will be clear that, because of the provision of the additional slots 17 and 19, the unit may also be hung from either a right-hand or a left-hand vertical support, in either vertical or horizontal position, or it may be hung from the under side of a suitable supporting device, in either vertical or horizontal position.

The wall 20 of the frame which, in the illustrated position of the unit may be referred to as its top wall, provides a suitable surface for the support of an electric motor 21 whose base 22 may be secured to the wall 20 by machine screws (not shown) or other suitable fastening means. It will be clear from an inspection of Fig. 1 that the spindle 23 of the motor is adapted to project beyond the plane of that end wall of the frame in which the opening 13 is formed. Outboard on the spindle 23, an expansible V-pulley, indicated generally by the reference numeral 24, is supported. As shown, the pulley 24 comprises a coned disc 25 having an elongated, socketed hub 26 projecting axially from its coned face, the socket of said hub receiving the motor spindle 23, and the disc being fixed to said spindle by a set screw 27, or the like. A mating coned disc 28 is slidably keyed upon the projecting hub 26, outboard with respect to the disc 25, and is adapted to be moved axially toward and away from the disc 25. The disc 28 is provided with a rearwardly-projecting hub 29 upon which is axially fixed a thrust bearing 30 through the medium of which the position of the disc 28 relative to the disc 25 may be controlled in the manner later to appear.

Figure 5:
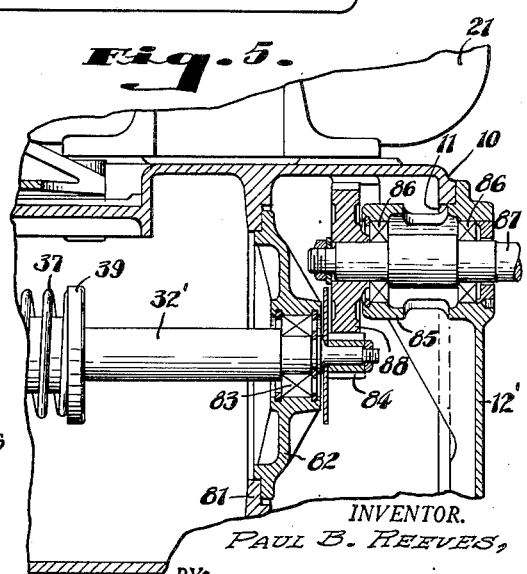
Fig. 5 is a fragmentary sectional view similar to Fig. 1 and showing a modified construction.

The closure plate 12 carries an antifriction bearing 31 in which, in the form of invention illustrated in Fig. 1, is journalled one end of an output shaft 32. Said shaft extends longitudinally through the frame 10 and projects through the opening 13 to carry, adjacent its opposite end, a resiliently-expansible V-pulley indicated generally by the reference numeral 33. It is to be noted that the frame 10 is so constructed as to provide space for housing a gear reduction unit, or the like, which may be interposed between the closure plate 12 and the wall provided with the opening 13. Such a unit may be a conventional assembly snugly housed within the frame 10, or, as shown in Fig. 5, it may be a specially designed assembly built into the machine frame. In the claims appended hereto, I have referred to a shaft, such as the shaft 32, having one end journalled in the frame 10 and carrying a V-pulley adjacent its opposite end. In such claims, unless other restrictive language is used, the reference to such a shaft is intended to be construed broadly enough to include shafting, such, for instance, as that particularly illustrated in Fig. 5, in which mechanism such as a gear reduction unit or an automatic clutching device or the like, is interposed.

As shown, the pulley 33 comprises a coned disc 34 having a hub 35 in which is carried a set screw 35' whereby the disc 34 is secured to the shaft 32. Slidably keyed upon the hub 35 is a mating coned disc 36; and a spring 37 is sleeved upon the hub 38 of the disc 36 and is confined between the disc 36 and an abutment element 39 fixed to the hub 35 of the disc 34. It will be apparent that the spring 37 continuously urges the disc 36 toward the disc 34, and resiliently resists movement of the disc 36 away from the disc 34.

An edge-active belt 40 provides a driving connection between the pulleys 24 and 33. With the parts in the illustrated positions of adjustment, the velocity of the shaft 32 will, of course, be less than that of the spindle 23. If, during operation of the unit, the disc 28 is pressed toward the disc 25, the belt 40 will be crowded outwardly between those discs and will be pulled more deeply into the crotch defined between the discs 34 and 36, forcing the disc 36 toward the right against the tendency of the spring 37, thus increasing the velocity of the shaft 32 relative to that of the spindle 23. If pressure tending to force the disc 28 toward the right is relieved, the spring 37 will force the disc 36 toward the left, crowding the belt 40 outwardly between the discs 36 and 34, and pulling the belt inwardly between the discs 25 and 28 to force the disc 28 to move toward the left.

At the left-hand end of its upper surface, the frame 10 is formed to provide a seat or support 41 opening through the left-hand end of the frame. An auxiliary frame, indicated generally by the reference numeral 42, is adapted to be entered upon said seat by longitudinal movement toward the right, as viewed in Fig. 1. As is clearly shown, the seat 41 is located between the spindle 23 and the shaft 32 and in a plane parallel with the axes of said spindle and shaft.

The frame 42 is a box-like structure, elongated in the direction of said axes and formed to provide an upper wall 43, formed with a longitudinally-extending slot 44 for a reason to become apparent, and an opposite lower wall 45. A bracket element 46 is removably secured to the wall 45 of the auxiliary frame by machine screws 47 or the like, and projects downwardly from the auxiliary frame to carry, near its lower extremity and in axial alignment with the bearing 31, an antifriction bearing 48 in which is journalled the left-hand end of the shaft 32.

Intermediate its ends, the auxiliary frame 42 is formed to provide a web 49 spanning the distance between the walls 43 and 45 and carrying an antifriction bearing 50. At its outer end, the frame 42 carries a plate 51 in which is mounted an antifriction bearing 52 axially aligned with the bearing 50; and a screw shaft 53 is journal mounted in the bearings 50 and 52. The construction of the shaft and its bearings will be such that said screw shaft is readily rotatable, but is held against axial reciprocation, relative to the frame 42. A nut 54 is threadedly mounted upon the shaft 53 between adjustable stops 55 and 56 which are likewise threadedly mounted on said shaft and provided with means for securing the same in any selected positions of adjustment relative to the screw shaft.

A bracket member 57 is removably secured to the upper wall 43 of the auxiliary frame 42 by means of machine screws 58 or other suitable fastening means, and said bracket member projects upwardly from said wall. A pivot or trunnion means 59 is carried by the bracket member 57 well above the wall 43, but below the position of the axis of motor spindle 23, said pivot means being located upon an axis transverse with respect to the plane common to the motor spindle 23 and the screw shaft 53. A lever 60 is oscillably supported, intermediate its ends, upon the pivot means 59. One arm 61 of said lever projects into the path of the nut 54. In the illustrated embodiment of the invention, said lever arm 61 is forked, straddles the screw shaft 53, and likewise straddles a radially-projecting ear 62 on the nut 54 to hold said nut against rotation with the shaft 53.

The opposite arm 63 of the lever 60 is likewise forked and straddles the hub 29 to bear against the outboard face of the thrust bearing 30.

As is most clearly shown in Fig. 1, the inner end of the upper wall 43 of the frame 42 is inclined downwardly and is interrupted, as at 64, to accommodate the bulge of the adjacent end of the frame of the motor 21 and to provide access to machine screws 65 or the like through which said auxiliary frame may be secured in place on its seat 41 of the main frame 10.

Figure 3:
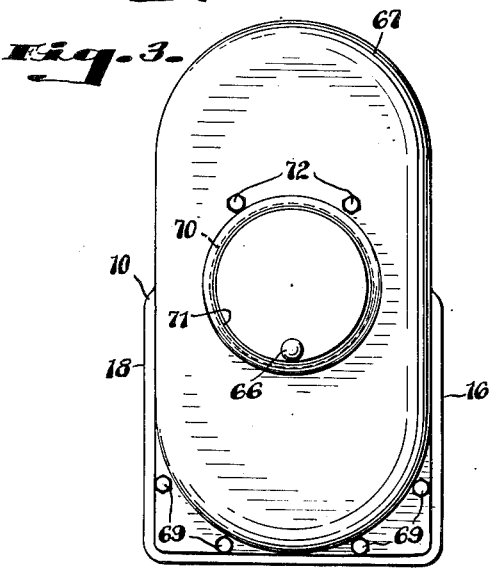
Fig. 3 is an end elevation of the said unit, viewed from the left of Fig. 1.

The outboard end of the screw shaft 53 carries, in the form of invention illustrated in Figs. 1 to 3, a hand wheel 66 through which said shaft may be manipulated. It will be clear that, as the hand wheel 66 is rotated in one direction, the nut 54, which is held against rotation with the shaft 53, will be moved axially toward the left, as viewed in Fig. 1, thereby forcing the lever 60 to rock in a clockwise direction. The arm 63 of the lever 60, engaging the thrust bearing 30, will correspondingly force the disc 28 toward the right, thereby increasing the velocity of the shaft 32 in the manner above described. When the hand wheel is rotated in the opposite direction, the nut 54 will be moved toward the right, thereby relieving the pressure of the lever arm 63 against the thrust bearing 30, and permitting the spring 37 to shift the disc 36 toward the left. Such movement of the disc 36, acting through the belt 40, will force the disc 28 and its thrust bearing 30 to follow the counter-clockwise movement of the arm 63 of the lever 60, whereby the arm 61 of said lever will follow the movement of the nut 54 toward the right.

I prefer to house the operating parts of the transmission unit in a guard shell which, in the illustrated embodiment of the invention, may be an integral sheet metal element 67. At its lower corners, said element is provided with outturned flanges 68 which may be secured to the corresponding corners of the left-hand end wall of the frame 10 by machine screws 69, or other equivalent fastening means. The upper portion of the shell 67 will preferably be secured to the member 57 by machine screws 72 or other equivalent fastening means. A closing plate or wall 70 is provided preferably fastened to the end 51 of frame 42 and disposed so that it comes adjacent to the inner side of shell 67 and handwheel 66. Shell 67 is constructed with an opening 71 of a larger diameter than that of handwheel 66 and smaller than that of plate 70.

Preferably, the thrust bearing 30 will carry fingers 73, the furcations of the lever arm 63 being disposed in the paths of said fingers to hold the thrust bearing housing positively against rotation with the pulley 24.

It will be seen that the shell 67 may be dismounted by removal of the screws 69 and 72, thus exposing the operating parts of the transmission. Now, by removal of the screws 65, the entire actuating mechanism can be removed from the unit, permitting the removal of the disc 28, and clearing the left-hand end of the shaft 32 for the easiest possible removal and replacement of the belt. Alternatively, the frame 42 being left in place, the bracket member 57 may be removed, or the lever 69 may be removed from said bracket member, thus likewise permitting removal of the disc 28, whereafter the belt 40 may be slipped past the disc 34 and past the bracket 46 and so off the end of the auxiliary frame.

As the belt 40 may need replacing more often than other elements of the transmission, it will be noted that this may be accomplished by removing only the guard shell 67 to gain access for this operation.

By spreading the discs 34 and 36 space is gained between them (as is gained between discs 25 and 28 in the position shown in Fig. 1) thus permitting the belt to be threaded first over either disc 28 or disc 34 and then over the remaining disc for removing or replacing the belt.

The speed adjusting elements, consisting of the auxiliary frame 42, screw 53, lever 60, bracket 57, bearing 30 and handwheels 66 etc. and the bracket element 46 and bearing 48, substantially on the side of the discs opposite the main frame 10, are so disposed as to permit the belt 40 to be passed freely over them, and on or off the discs, without disturbing their position or assembly with the main frame.

Because the shaft 32 is journalled in bearings carried, respectively, by the removable plate 12 and the removable bracket 46, it is possible to assemble shafting of various sizes and characteristics selectively in the unit, by substituting a different plate 12 and/or a different bracket 46.

Without removing the shell 67, the motor 21 can be released from the frame wall 20 and shifted toward the right to expose the set screw 27, after which the spindle 23 may be withdrawn from the socket in the hub 26, and a new motor can be installed without disturbing the remainder of the assembly.

The extreme versatility of the disclosed assembly is thus made apparent.

In Fig. 4, I have shown an alternative structure in which the screw shaft 53' is formed with an extension 75 upon which is fixed a worm wheel 76. In this form of the invention, an operating shaft 77 is journalled in the frame 10 upon an axis transverse with respect to the plane common to the screw shaft 53' and the motor spindle; and said shaft 77 carries a worm gear 78. The bottom wall of the auxiliary frame 42 is slotted, as at 79, to accommodate the worm wheel 76, the parts being so proportioned and designed that, when the auxiliary frame is in position on the seat 41, the worm wheel 76 meshes with the worm gear 78. A hand wheel 80 is carried on the shaft 77 outside the frame 10; and of course the screw shaft 53' is manipulable through the said hand wheel 80. The operation of this form of the invention is directly analogous to that described above.

The shaft 77 will preferably traverse the frame 10 from side to side and projects from both sides thereof so that the hand wheel 80 may selectively be mounted upon either end of said shaft.

In Fig. 5, I have shown a specially designed reduction gear built into the frame 10. The flange 81 may be perimetrally continuous or interrupted; but it is arranged to support, if desired, a plate or head 82 which carries an antifriction bearing 83 located upon the same axis occupied by the bearing 31 of Fig. 1. In this form of the invention, the shaft 32' is substantially shorter than the shaft 32 of Fig. 1, and terminates just beyond the bearing 83 to carry, outboard with respect to said bearing, a pinion 84.

A plate 12' closes the opening 11 in the frame 10, in this form of the invention, and is formed to provide a barrel 85 supporting bearing means 86, 86 in which is journalled an output shaft 87 carrying, at its inner end, a gear 88 meshing with the pinion 84.

This construction, of course, provides an extremely compact speed-reducing assembly, utilizing space necessarily provided within the frame 10 because of the frame dimensions required to carry the motor 21. At the same time, a reduction gear is provided at minimum cost, since no housing therefor, aside from the frame 10 is required.

As is stated above, the shafting comprising the elements 32' and 87 is the equivalent, so far as concerns certain of the claims appended hereto, of the shaft 32 illustrated in Fig. 1.

I claim as my invention:

1. In a device of the class described, a main frame, a first shaft, means supported from said frame and providing a journal mounting for said first shaft, a second shaft, means supported from said frame and providing a journal mounting for one end of said second shaft upon an axis substantially parallel with the axis of said first shaft, said main frame providing a support intermediate said shaft axes and substantially parallel therewith, an auxiliary frame removably carried by said support, said auxiliary frame providing a journal mounting for the other end of said second shaft, an expansible V-pulley mounted on said first shaft and comprising a coned disc fixed to said first shaft and a mating coned disc supported for movement along the axis of said first shaft toward and away from its fellow, a screw shaft journalled in said auxiliary frame, a nut threadedly mounted on said screw shaft and held against rotation therewith, an actuator supported from said auxiliary frame and providing an operative connection between said nut and said mating coned disc, an expansible V-pulley mounted on said second shaft, and an edge-active belt providing a driving connection between said pulleys.

2. In a device of the class described, a main frame, a first shaft, means supported from said frame and providing a journal mounting for said first shaft, a second shaft, means supported from said frame and providing a journal mounting for one end of second shaft upon an axis substantially parallel with the axis of said first shaft, said main frame providing a support intermediate said shaft axes and substantially parallel therewith, an auxiliary frame removably carried by said support, said auxiliary frame providing a journal mounting for the other end of said second shaft, an expansible V-pulley mounted on said first shaft and comprising a coned disc fixed to said first shaft and a mating coned disc supported for movement along the axis of said first shaft toward and away from its fellow, a screw shaft journalled in said auxiliary frame upon an axis substantially parallel with said shaft axes, a nut threadedly mounted on said screw shaft, pivot means supported from said auxiliary frame upon an axis substantially perpendicular to the plane common to the axes of said first shaft and said screw shaft, a lever mounted to oscillate about the axis of said pivot means, said lever being operatively associated with said nut and with said mating coned disc to provide a driving connection therebetween, an expansible V-pulley mounted on said second shaft, and an edge-active belt providing a driving connection between said pulleys.

3. In a device of the class described, a main frame, a first shaft, means supported from said frame and providing a journal mounting for said shaft, an expansible V-pulley mounted on said shaft and comprising a coned disc fixed to said shaft and a mating coned disc movable along the axis of said shaft toward and away from its fellow, a second shaft, means supported from said frame and providing a journal mounting for one end of said second shaft upon an axis substantially parallel with the axis of said first shaft, a second expansible V-pulley mounted on said second shaft near the other end thereof, said frame providing a seat intermediate the axes of said shafts and substantially parallel therewith, an auxiliary frame removably supported on said seat, means supported from said auxiliary frame and providing a journal mounting for said other end of said second shaft, an actuator supported from said auxiliary frame and operatively connected with said movable disc of said first-named pulley, manipulable means carried by said auxiliary frame and operatively connected with said actuator to shift the same, and an edge-active belt providing a driving connection between said pulleys.

4. In a device of the class described, a main frame, a first shaft, means supported from said frame and providing a journal mounting for said shaft, an expansible V-pulley mounted outboard on said shaft and comprising a coned disc fixed to said shaft and a mating coned disc located outboard relative to its fellow and movable along the axis of said shaft toward and away from its fellow, a second shaft, means supported from said frame and providing a journal mounting for that end of said second shaft remote from the outboard end of said first shaft, upon an axis substantially parallel with the axis of said first shaft, a second expansible V-pulley mounted on said second shaft near the other end thereof, said frame providing a seat intermediate the axes of said shafts and substantially parallel therewith, an auxiliary frame supported on said seat and removable therefrom in the direction of outboard extension of said first shaft, means supported from said auxiliary frame and providing a journal mounting for said other end of said second shaft, an actuator supported from said auxiliary frame and extending into cooperative relation with the outboard end of said shiftable disc, manipulable means carried by said auxiliary frame and operatively connected with said actuator to shift the same, and an edge-active belt providing a driving connection between said pulleys.

5. The combination with a main frame, a pair of shafts, means carried by said main frame providing journal mountings for said shafts on parallel axes, an expansible V-pulley mounted outboard on one of said shafts and comprising a coned disc fixed to said one shaft and a mating coned disc, located outboard relative to its fellow and shiftable along the axis of said shaft toward and away from its fellow, a resiliently-expansible V-pulley mounted on the other of said shafts near the end thereof corresponding to the outboard end of said one shaft, and an edge-active belt providing a driving connection between said pulleys, said frame providing a seat intermediate the axes of said shafts and opening in the direction of outboard projection of said one shaft, of an auxiliary frame comprising a body insertable longitudinally into said seat, a screw shaft journalled in said body upon an axis extending longitudinally of said body, means projecting in one direction laterally from said body and supporting bearing means receiving the last-mention end of said other shaft, means projecting laterally in another direction from said body and supporting pivot means on an axis transverse to the axes of said shafts, an actuator lever pivotally mounted upon said pivot means, and a nut threadedly mounted on said screw shaft, one portion of said lever being operatively associated with said nut to hold said nut against rotation and to move therewith longitudinally of said screw shaft, and another portion of said lever being operatively associated with said shiftable disc to provide a driving connection between said nut and said disc.

6. The combination of claim 5 in which said lever is supported intermediate its ends on said pivot means, a thrust bearing carried at the outboard side of said shiftable disc, said one portion of said lever being a yoke at one end thereof straddling said nut, and said other portion of said lever being a yoke at the other end thereof bearing against the outboard end of said thrust bearing.

7. The combination of claim 5 including a housing supported from said main frame and enclosing said pulleys, said belt and said auxiliary frame, and a handwheel fixed to said screw shaft and located outside said housing.

8. The combination of claim 5 including a worm wheel mounted on said screw shaft, an operating shaft journalled in said main frame upon an axis transverse with respect to the axes of said pulley-supporting shafts, and a worm gear fixed to said operating shaft and meshing with said worm wheel when said auxiliary frame is settled on said seat.

9. A device of the class described comprising a main frame, a motor supported on said frame and having a spindle, an expansible V-pulley mounted on said spindle and comprising a coned disc fixed on said spindle and a mating coned disc located outboard relative to its fellow and shiftable along the axis of said spindle toward and away from its fellow, a shaft having one end journalled in said frame upon an axis parallel with the axis of said spindle, a resiliently-expansible V-pulley mounted on said shaft near the other end thereof, an edge-active belt providing a driving connection between said pulleys, and an auxiliary frame removably supported from said main frame intermediate the axes of said pulleys, said auxiliary frame carrying bearing means for the last-mentioned end of said shaft and actuating means for said shiftable disc.

10. The device of claim 9 in which said actuating means comprises a screw shaft journalled for rotation but held against axial movement in said auxiliary frame, a lever, means carried by said auxiliary frame and pivotally engaging said lever intermediate its ends for oscillation in a plane including the axis of said spindle, and a nut threadedly mounted on said screw shaft, said lever having one end operatively engaged with said nut and its other end operatively associated with said shiftable disc to provide a driving connection therebetween.

11. The device of claim 10 including gear means fixed on said screw shaft, a further shaft journalled in said main frame upon an axis disposed in a plane angularly related to the axis of said spindle, and gear means fixed on said further shaft and meshing with said first-named gear means when said auxiliary frame is operatively seated on said main frame.

12. The device of claim 11 in which said first-named gear means is a worm wheel, said second-named gear means is a worm gear, and said plane is perpendicular to said spindle axis.

13. As an article of manufacture, an actuator assembly for a speed-varying power transmission comprising an elongated frame having substantially plane opposite spaced walls, web means joining said opposite walls, a screw shaft journal mounted in said web means between said walls for rotation upon an axis substantially parallel with said walls, an element removably secured to one of said walls and projecting therefrom in a direction away from the other of said walls, bearing means carried by said element and disposed on an axis substantially parallel with the axis of said screw shaft, a member removably carried by the other of said walls and projecting therefrom in a direction away from said one wall, pivot means supported from said member upon an axis transverse to the direction of length of said screw shaft, a nut threadedly mounted on said screw shaft, and a lever pivotally supported on said pivot means, said lever having a portion operatively engaged with said nut and another portion spaced from said frame in the direction of projection of said member.

14. As an article of manufacture, an actuator assembly for a speed-varying power transmission comprising an elongated frame having substantially plane opposite spaced walls, web means joining said opposite walls, a screw shaft journal mounted in said web means between said walls for rotation upon an axis substantially parallel with, and extending in the direction of length of, said walls, an element removably secured to one of said walls and projecting therefrom in a direction away from the other of said walls, bearing means carried by said element and disposed on an axis substantially parallel with the axis of said screw shaft, a member removably carried by the other of said walls and projecting therefrom in a direction away from said one wall, pivot means supported from said member upon an axis transverse to the direction of length of said screw shaft, a nut threadedly mounted on said screw shaft, and a lever pivotally supported between its ends on said pivot means, one arm of said lever being operatively engaged with said nut, and the other arm thereof projecting, in the direction of projection of said member, beyond the position of said pivot means.

15. A device of the class described comprising a main frame, a motor supported on said frame and having a spindle, an expansible V-pulley mounted on said spindle and comprising a coned disc fixed on said spindle and a mating coned disc located outboard relative to its fellow and shiftable along the axis of said spindle toward and away from its fellow, a shaft having one end journalled in said frame upon an axis parallel with the axis of said spindle, a resiliently-expansible V-pulley mounted on said shaft near the other end thereof, an edge-active belt providing a driving connection between said pulleys, an auxiliary frame removably supported from said main frame intermediate the axes of said pulleys, said auxiliary frame carrying bearing means for the last-mentioned end of said shaft and actuating means for said shifable disc, a guard shell enclosing said pulleys and said auxiliary frame, fastening means securing said shell to said main frame, and fastening means securing said shell to said auxiliary frame.

16. In a device of the class described, a main frame, a first shaft, means supported from said frame and providing a journal mounting for said first shaft, a second shaft, means supported from said frame and providing a journal mounting for one end of said second shaft upon an axis substantially parallel with the axis of said first shaft, said main frame providing a support intermediate said shaft axes and substantially parallel therewith, an auxiliary frame removably carried by said support, said auxiliary frame providing a journal mounting for the other end of said second shaft, an expansible V-pulley mounted on said first shaft and comprising a coned disc fixed to said first shaft and a mating coned disc supported for movement along the axis of said first shaft toward and away from its fellow, a screw shaft journalled in said auxiliary frame, a nut threadedly mounted on said screw shaft and held against rotation therewith, an actuator supported from said auxiliary frame and providing an operative connection between said nut and said mating coned disc, an expansible V-pulley mounted on said second shaft, an edge-active belt providing a driving connection between said pulleys, a guard shell enclosing said pulleys and said auxiliary frame, fastening means securing said shell to said main frame, and fastening means securing said shell to said auxiliary frame.

PAUL B. REEVES.

REFERENCES CITED

The following references are of record in the file of this patent:

UNITED STATES PATENTS

| Number | Name | Date |
| --- | --- | --- |
| 818,450 | Hunter | Apr. 24, 1906 |
| 2,161,894 | Bishop | June 13, 1939 |
| 2,557,849 | Victory | June 19, 1940 |
| 2,205,975 | Heyer | June 25, 1940 |

FOREIGN PATENTS

| Number | Country | Date |
| --- | --- | --- |
| 17,683 | Great Britain | 1909 |